United States Patent [19]

Sakamoto

[11] Patent Number: 4,608,565
[45] Date of Patent: Aug. 26, 1986

[54] INDOOR/OUTDOOR THERMOMETER WITH REMOTE SENSING UNIT

[75] Inventor: Tamaki Sakamoto, Kyoto, Japan

[73] Assignee: Omron Tateisi Electronics Co., Kyoto, Japan

[21] Appl. No.: 729,167

[22] Filed: Apr. 30, 1985

[30] Foreign Application Priority Data

May 1, 1984 [JP] Japan .................... 59-86228

[51] Int. Cl.[4] ................ G01K 3/06; G08B 13/24
[52] U.S. Cl. ................ 340/870.17; 374/109; 374/120
[58] Field of Search ............ 374/122, 170, 109; 455/90; 340/870.17

[56] References Cited

U.S. PATENT DOCUMENTS

| 3,326,045 | 6/1967 | Vrsaljko | 374/109 X |
|---|---|---|---|
| 3,541,450 | 11/1970 | Paine | 340/870.17 |
| 3,582,921 | 6/1971 | Krieger | 340/870.17 X |
| 4,106,340 | 8/1978 | Hamid | 374/122 X |
| 4,140,999 | 2/1979 | Conway | 340/870.17 X |
| 4,184,159 | 1/1980 | Andersson | 340/870.17 X |
| 4,274,475 | 6/1981 | Rall et al. | 374/109 |
| 4,298,947 | 11/1981 | Tamura et al. | 374/170 X |
| 4,403,218 | 9/1983 | Beal et al. | 340/870.17 X |
| 4,406,550 | 9/1983 | Gray | 374/170 X |
| 4,455,096 | 6/1984 | Brandstedt | 340/870.17 X |

Primary Examiner—Daniel M. Yasich
Attorney, Agent, or Firm—Cushman, Darby & Cushman

[57] ABSTRACT

A thermometer includes a temperature transmitting unit and a temperature receiving unit which are disposed on opposite sides of an exterior wall or window. An outdoor temperature sensor is connected to the transmitting unit for modulating the transmitted radio waves. The transmitting unit and receiver unit communicate with each other via radio waves so that they are not in physical contact with each other.

1 Claim, 3 Drawing Figures

INDOOR/OUTDOOR THERMOMETER WITH REMOTE SENSING UNIT

BACKGROUND OF THE INVENTION

Conventionally, in this type of thermometer, a temperature sensor installed outdoors or indoors is connected by a wire to a display installed indoors or outdoors. In getting this conductor wire through, use has generally been made of a hole formed in a wall or a clearance in a window frame, but there has been a problem that it is very difficult to provide such hole or to cut off the communication between the interior of the room and the open air if a clearance is provided.

SUMMARY OF THE INVENTION

The invention, which has been accomplished with the above problem in mind, has for its object the provision of a thermometer by which transmission of information between the inside and outside of a room can be attained without having to pass a conductor wire through the boundary between indoor and outdoor spaces.

The invention comprises temperature detecting means for detecting either indoor or outdoor temperature, carrier wave generating means for generating high frequency waves, modulating means for modulating carrier waves delivered from said carrier wave generating means with output signals from said temperature detecting means, a transmitting antenna for converting the output from said modulating means into waves, a receiving antenna for receiving waves from said transmitting antenna through a separating wall, demodulating means for taking out the output signals from said temperature detecting means from the output from said receiving antenna, an A/D converter for A/D converting the output from said demodulating means, and displaying means for displaying the output from said A/D converter.

Therefore, in the boundary between indoor and outdoor spaces, signals are transmitted by waves, so that there is no need to provide such an opening as will allow passage of air therethrough; thus the invention has the effect of being capable of measuring and displaying temperature while cutting off passage of air between indoor and outdoor spaces.

BRIEF DESCRIPTION OF THE DRAWINGS

The drawings illustrate a thermometer according to an embodiment of the invention.

DETAILED DESCRIPTION OF THE INVENTION

Figure 1:
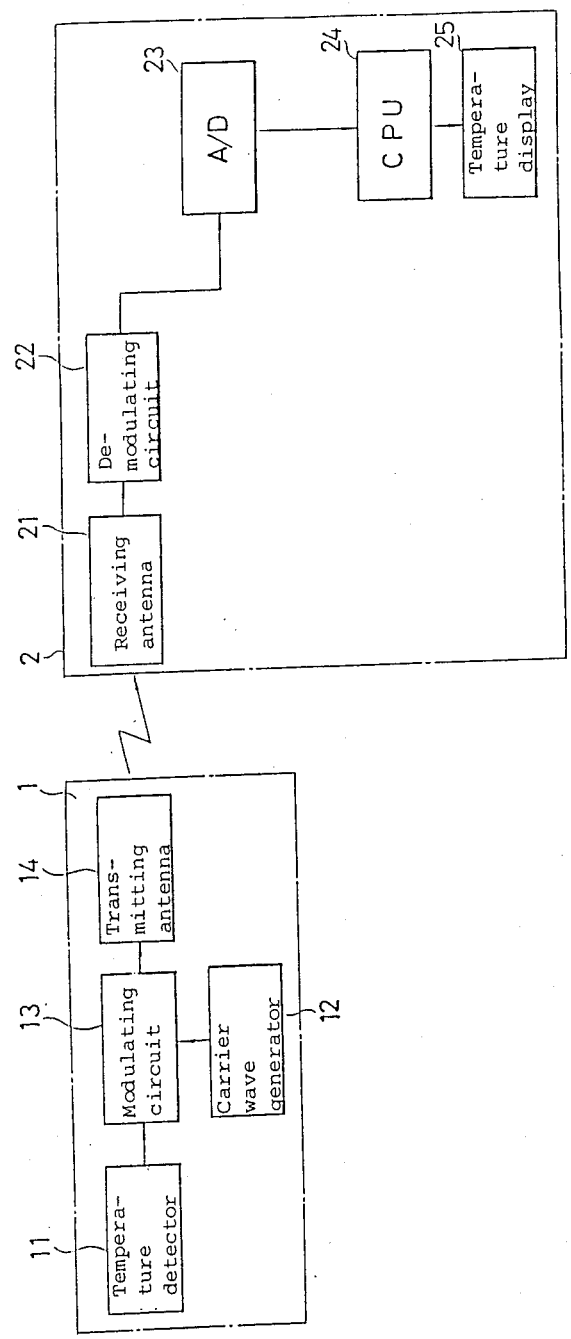
FIG. 1 is a block diagram of the invention.

An embodiment of the invention will now be described with reference to the drawings. FIG. 1 is a block diagram for explaining the arrangement of an outdoor thermometer. The portion surrounded with a dash-dot line and denoted by the reference character 1 is an outdoor temperature sensor section installed outdoors. The outdoor temperature sensor section 1 includes a temperature detector 11 and a carrier wave generator 12 for generating high frequency waves. It also includes a modulating circuit 13 for modulating carrier waves delivered from said carrier wave generator 12 with output signals from the temperature detector 11, and a transmitting antenna 14 for radiating the output from the modulating circuit 13 into space as waves. The portion surrounded with a dash-dot line and denoted by the reference character 2 is an indoor display section installed indoors, which includes a receiving antenna 21 for receiving waves radiated from said transmitting antenna 14. The receiving antenna 21 includes a tuning circuit and it delivers a voltage which agrees with the waves sent by said transmitting antenna 14. The output from the receiving antenna 21 is transferred to a demodulating circuit 22. The output from the demodulating circuit 22 becomes a voltage corresponding to the output from said temperature detector 11. The voltage corresponding to the output from the temperature detector 11 is transferred to an A/D converter 23 by which it is converted into a digital quantity. The digital quantity delivered from said A/D converter 23 is inputted into a CPU 24. The digital quantity inputted into the CPU 24 is processed and fed to a temperature display section 25. This temperature display section has an LED and a drive circuit therefor.

Figure 2:
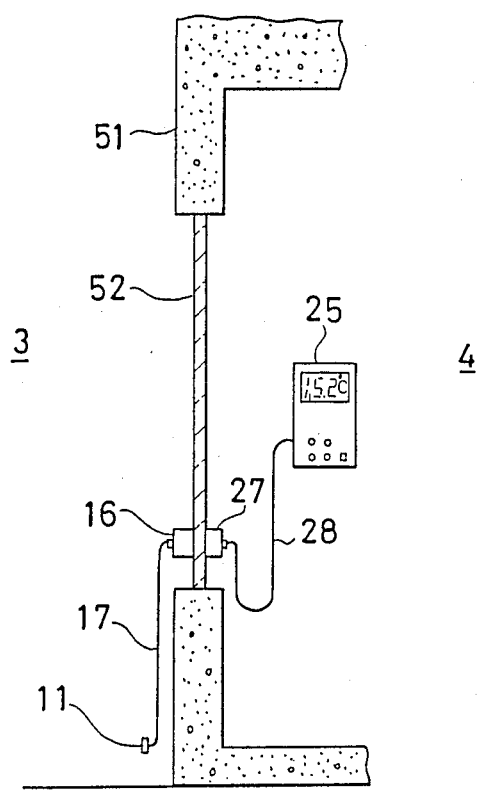
FIG. 2 is a sectional view showing one example of how the invention can be installed.

FIG. 2 is a sectional view showing how an outdoor thermometer having the aforesaid arrangement is installed. The reference character 3 denotes an outdoor space, and 4 denotes an indoor space. The boundary between the outdoor and indoor spaces 3 and 4 is defined by a wall 51 and a windowpane 52. The temperature detector 11 is led out from said outdoor temperature sensor section 1 by electrical wire 17, the other portions being bonded to the outdoor side of the windowpane 52 as an outdoor device 16. Further, the temperature display 25 and, though not shown, the CPU 24 and A/D converter 23 are led out from said indoor display section 2 by electrical wire 28, the other portions being bonded to the indoor side of the windowpane 52 as an indoor device 27. In installing these outdoor and indoor devices 16 and 27 by bonding them to the windowpane, it is not necessary that they be opposed to each other. However, if they are opposed to each other, transmission of signals can be effected with a very weak wave.

Figure 3:
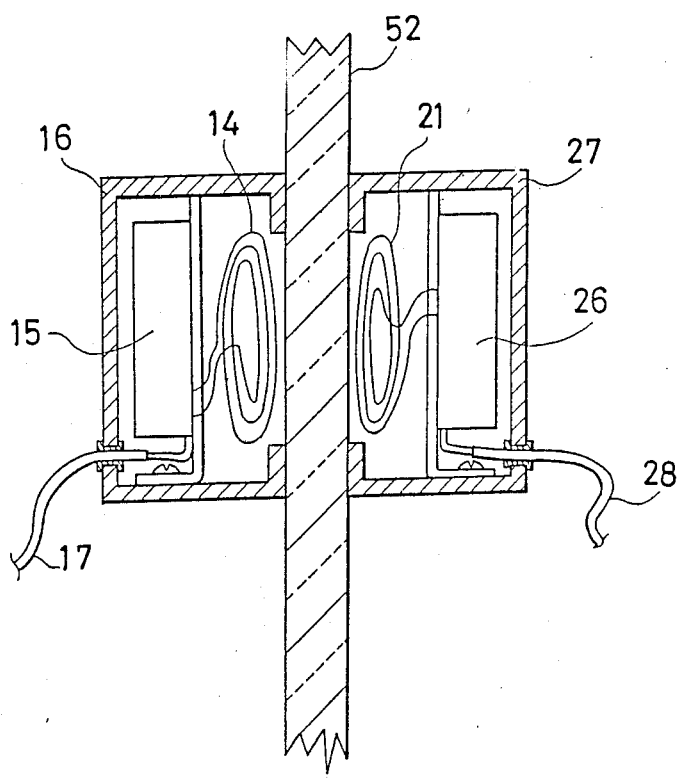
FIG. 3 is an enlarged sectional view of a principal portion of the invention.

FIG. 3 is an enlarged sectional view of the principal portion of FIG. 2. The outdoor device 16 comprises an outdoor circuit 15 which includes a carrier wave generator 12 and a modulating circuit 13, and a transmitting loop antenna 14. An indoor device 27 comprises an indoor circuit 26 which includes a receiving antenna 21 and a demodulating circuit 22. The reason for using loop antennas in the form of a conductor wire wound a plurality of turns as the antennas is that they are inexpensive and that the distance to be traveled by waves is only the thickness of the windowpane 52 so that waves will satisfactorily arrive at the antenna.

In addition, in this embodiment, the temperature sensor section 1 is installed outdoors and the display section 2 indoors; however, the display section 2 may, of course, be installed outdoors and the temperature sensor section 1 indoors.

What is claimed is:
1. A thermometer comprising:
   temperature detecting means, including a temperature sensor, for detecting temperature;
   carrier wave generating means for generating high frequency waves;

modulating means for modulating carrier waves delivered from said carrier wave generating means with output signals from said temperature detecting means into modulated output signals;

transmitting means including an antenna for converting the output signals from said modulating means into waves;

receiving means including an antenna for receiving said waves from said transmitting antenna;

demodulating means for demodulating the carrier waves and output signals from said modulating means received by said receiving means;

an A/D converter connected to said demodulating means for converting the output from said demodulating means; and displaying means for displaying the output from said A/D converter;

wherein said transmitting means and receiving means are disposed so as not to be in physical contact with each other and mounted on opposite sides of any one of a wall, partition and window so as to be located substantially adjacent each other.

* * * * *